US008878791B2

(12) United States Patent
Grover et al.

(10) Patent No.: US 8,878,791 B2
(45) Date of Patent: Nov. 4, 2014

(54) EVENT GENERATION BASED ON PRINT PORTION IDENTIFICATION (75) Inventors: Douglas Max Grover, Westminster, CO (US); Paul Roller Michaelis, Louisville, CO (US); David S. Mohler, Arvada, CO (US); Richard L. Robinson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1253 days.

(21) Appl. No.: 12/689,567

(22) Filed: Jan. 19, 2010

(65) Prior Publication Data

US 2011/0175804 A1    Jul. 21, 2011

(51) Int. Cl.
*G06F 3/041* (2006.01)
*G06F 3/0488* (2013.01)
*G06F 3/0482* (2013.01)
*G06K 9/00* (2006.01)
*G06F 3/042* (2006.01)

(52) U.S. Cl.
CPC ............ *G06K 9/00006* (2013.01); *G06F 3/042* (2013.01); *G06F 3/0488* (2013.01); *G06F 3/0482* (2013.01)
USPC ............................ 345/173; 382/124; 345/156

(58) Field of Classification Search
CPC . G06F 3/0482; G06F 3/0484; G06F 11/3668; G06F 3/016; G06F 3/048; G06F 3/04817; G06F 3/04847; G06F 3/0486; G06F 3/04886; G06F 11/3688; G06F 13/10; G06F 13/24; G06F 17/218; G06F 17/24; G06F 2203/0338; G06F 3/03547; G06F 3/0488; G06F 3/042; G06F 1/1616; G06F 1/1662; G06F 3/0233; G06F 3/0235; G06F 1/1626; G06F 1/163; G06F 1/1641; G06F 1/1671; G06F 1/1684
USPC ................................... 345/156, 173–179, 169
See application file for complete search history.

(56) References Cited

U.S. PATENT DOCUMENTS 5,229,764 A    7/1993  Matchett et al.
5,420,936 A    5/1995  Fitzpatrick et al.
(Continued)

FOREIGN PATENT DOCUMENTS

CN         1732507      2/2006
CN         1808361      7/2006
WO    WO 03/017244     2/2003

OTHER PUBLICATIONS

Official Action for United Kingdom Patent Application No. GB 1021672.9, dated Mar. 16, 2012 3 pages.

(Continued)

*Primary Examiner* — Duc Dinh
(74) *Attorney, Agent, or Firm* — Sheridan Ross P.C.

(57) ABSTRACT

An optical scanner is configured to scan multiple print portions of a body part such as a finger. The optical scanner identifies a first one of the print portions in an area of an optical surface. An event such as launching an application is generated based on identifying the first print portion in the area of the optical surface. In addition, various events can be generated based on different combinations of print portions in different areas of the optical surface.
In a second embodiment, a property detector is configured to identify different properties of a sleeve in different areas of a surface. An event is generated based on the detection of a property of the sleeve in an area of the surface.

20 Claims, 7 Drawing Sheets

(56) References Cited

U.S. PATENT DOCUMENTS

| | | | |
|---|---|---|---|
| 6,278,443 | B1 | 8/2001 | Amro et al. |
| 6,400,836 | B2 | 6/2002 | Senior |
| 6,941,001 | B1 | 9/2005 | Bolle et al. |
| 7,697,729 | B2 * | 4/2010 | Howell et al. .............. 382/115 |
| 2003/0123714 | A1 * | 7/2003 | O'Gorman et al. .......... 382/124 |
| 2004/0042645 | A1 | 3/2004 | Wang |
| 2005/0134427 | A1 | 6/2005 | Hekimian |
| 2005/0219200 | A1 | 10/2005 | Weng |
| 2006/0284853 | A1 | 12/2006 | Shapiro |
| 2007/0273658 | A1 | 11/2007 | Yli-nokari et al. |
| 2008/0158170 | A1 | 7/2008 | Herz et al. |
| 2008/0259053 | A1 | 10/2008 | Newton |
| 2008/0317302 | A1 * | 12/2008 | Abdallah et al. ............. 382/124 |
| 2009/0152343 | A1 | 6/2009 | Carter et al. |
| 2009/0169070 | A1 | 7/2009 | Fadell |
| 2009/0224874 | A1 * | 9/2009 | Dewar et al. ................ 340/5.53 |
| 2009/0228901 | A1 | 9/2009 | Beaver et al. |
| 2011/0175807 | A1 | 7/2011 | Grover et al. |
| 2011/0248927 | A1 | 10/2011 | Michaelis et al. |

OTHER PUBLICATIONS

Official Action with English Translation for China Patent Application No. 201010624880.1, dated Mar. 26, 2013 17 pages.

Official Action for United Kingdom Patent Application No. GB1021672.9, dated Apr. 11, 2011 6 pages.

Oliver "Apple looks towards fingerprint-based multi-touch controls." AppleInsider, Jul. 2009, 6 pages, found at http://www.appleinsider.com/articles/09/07/02/apple_looks_towards_fingerprint_based_m . . .

Marsal "Apple looks to take multi-touch beyond the touch-screen." AppleInsider, Sep. 2008, 8 pages, found at http://www.appleinsider.com/articles/08/09/04/apple_looks_to_take_multi_touch_beyond . . .

Sugiura et al. "A User Interface Using Fingerprint Recognition—Holding Commands and Data Objects on Fingers," Proceedings of the 11th annual ACM symposium on User interface software and technology (UIST'98), 1998, 10 pages.

Official Action with English Translation for China Patent Application No. 201010624880.1, dated Nov. 21, 2013 7 pages.

Official Action with English Translation for China Patent Application No. 201010624880.1, dated Apr. 25, 2014 14 pages.

Official Action for United Kingdom Patent Application No. GB1021672.9, dated Aug. 2, 2013 4 pages.

* cited by examiner

EVENT GENERATION BASED ON PRINT PORTION IDENTIFICATION

TECHNICAL FIELD

The system and method relates to identification of prints and in particular to identification of print portions for generating events.

BACKGROUND

As the functionality in small mobile communication devices has increased, a demand for an increased functionality of user interfaces for these mobile communication devices has also increased. Users of these small mobile communication devices want the same functionality that is provided in non-mobile devices such as their personal computer. However, with the smaller screens that are pervasive in mobile communication devices, it has become increasingly more difficult to provide similar functionality.

Some systems have attempted to address this issue. For example, U.S. Patent Publication No. 2008/0158170 discloses a system that can provide multiple events based on a person touching/tapping an area on the screen with their fingernail versus tapping on the same area with their finger. The system can detect different properties of the skin versus the properties of the fingernail. This system also discloses using a sleeve so that the system can distinguish between the sleeve and the skin of a person to generate multiple events when an area of the screen is touched using the sleeve.

The problem with this system is that it does not use prints of body parts such as fingerprints or different properties in the sleeve to generate events. Being able to detect different print portions and/or different properties in a sleeve in different areas of a screen can provide the increased functionality that users are demanding from these mobile communication devices.

SUMMARY

The system and method are directed to solving these and other problems and disadvantages of the prior art. An optical scanner is configured to scan multiple print portions of a body part such as a finger. The optical scanner identifies a first one of the print portions in an area of an optical surface. An event, such as launching an application, is generated based on identifying the first print portion in the area of the optical surface. In addition, various events can be generated based on different combinations of print portions in different areas of the optical surface.

In a second embodiment, a property detector is configured to identify different properties of a sleeve in different areas of a surface. An event is generated based on the detection of a property of the sleeve in an area of the surface.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1A:
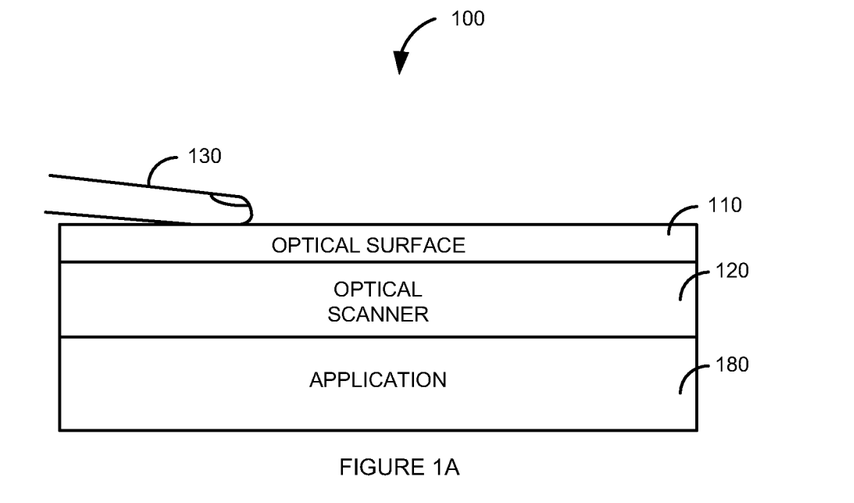
FIG. 1A is a block diagram of a first illustrative system for identifying a print portion of a body part in an area of an optical surface.

FIG. 1A is a block diagram of a first illustrative system 100 for identifying a print portion of a body part 130 in an area of an optical surface 110. The first illustrative system 100 comprises an optical surface 110, an optical scanner 120, and an application 180. The optical surface 110 can be any type of surface that the optical scanner 120 can scan through. For example, the optical surface 110 can be made of glass, plastic, or any material that allows the optical scanner 120 to scan a print portion of a body part 130. The optical surface 110 can be an optical surface 110 that allows the optical scanner 120 to scan through displayed objects/icons that are presented to a user. The optical surface 110 can be, for example, a touch screen, a computer screen, a mouse pad, a surface on a mouse, a surface on a joystick, a surface on a gaming controller, a surface on a button, a Liquid Crystal Display (LCD), and the like. The optical surface 110 can be part of the optical scanner 120. The body part 130 as shown in FIG. 1A is a finger; however, the body part 130 can be any body part 130 such as a thumb, a palm, a toe, and the like.

The optical scanner 120 can be any scanner that can detect a portion of a print of the body part 130 on or above an area of the optical surface 110. The optical scanner 120 can scan a print portion using different wavelengths and/or combinations of wave lengths such as visible light frequencies, ultraviolet frequencies, infra-red frequencies, and the like. The optical scanner 120 can scan at different light frequencies that are not blocked by the displayed objects/icons. The optical scanner 120 can scan at different angles to allow for display of objects/icons through the optical surface 110 and/or be embedded into the optical surface 110. The optical scanner 120 can include a processor, memory, a digital signal processor, and the like. The first illustrative system 100 can be implemented in a variety of devices such as a telephone, a cellular telephone, a Personal Digital Assistant (PDA), a gaming system or console, a Personal Computer (PC), a lap-top computer, a portable gaming device, a mouse, a joystick, a music system, and the like.

Figure 1B:
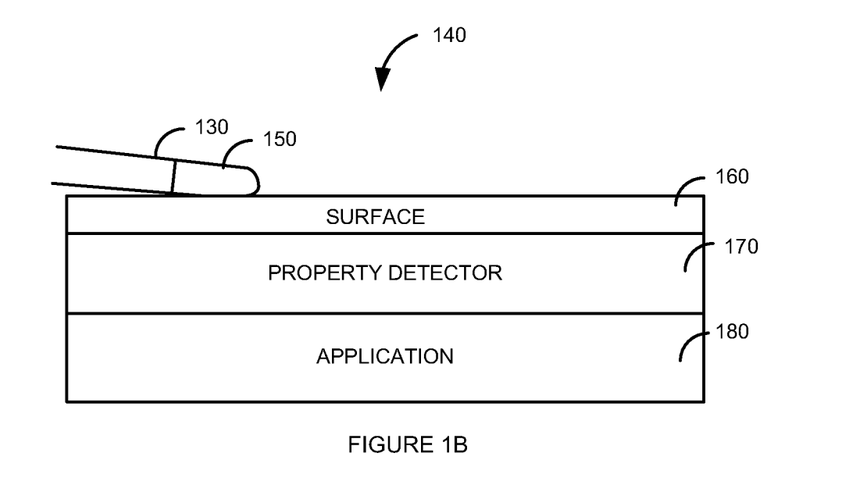
FIG. 1B is a block diagram of a second illustrative system for identifying a property of a sleeve in an area of a surface.

The application 180 can be any software and/or hardware application that can detect/process events generated/registered by the optical scanner 120 or the property detector 170 (see FIG. 1B). For example, the application 180 can be a word processing application, a gaming application, a spreadsheet, a telephony application, a calendar application, and the like.

FIG. 1B is a block diagram of a second illustrative system 140 for identifying a property of a sleeve 150 in an area of a surface 160. The second illustrative system 140 comprises a surface 160, a property detector 170, and the application 180. The surface 160 can be any type of surface that can detect different properties of the sleeve 150 that are well known in the art, such as those that detect capacitance, resistance, inductances, colors, and the like. The different properties can be different capacitances, different inductances, different resistances, different impedances, different colors, and the like. The different properties can be different combinations of the above properties. The surface 160 can be, for example, the optical surface 110, a touch screen, a computer screen, a mouse pad, a surface on a mouse, a surface on a joystick, a surface on a gaming controller, a surface on a button, an LCD display, and the like.

The property detector 170 can be any detector that can determine different properties of the sleeve 150. For example, the property detector 170 can be the optical scanner 120. The property detector 170 can scan the sleeve 150 to detect different wavelengths and/or combinations of wavelengths such as visible light frequencies, ultra-violet frequencies, infra-red frequencies, and the like. The property detector 170 can determine different properties in the sleeve 150 such as different capacitances, different inductances, different resistances, different impedances, and the like. The optical scanner 120 can include a processor, memory, a digital signal processor, and the like. The second illustrative system 140 can be implemented in a variety of devices such as a telephone, a cellular telephone, a Personal Digital Assistant (PDA), a gaming system, a Personal Computer (PC), a lap-top computer, a portable gaming device, a music system, a mouse, a joystick, and the like.

Figure 2A:
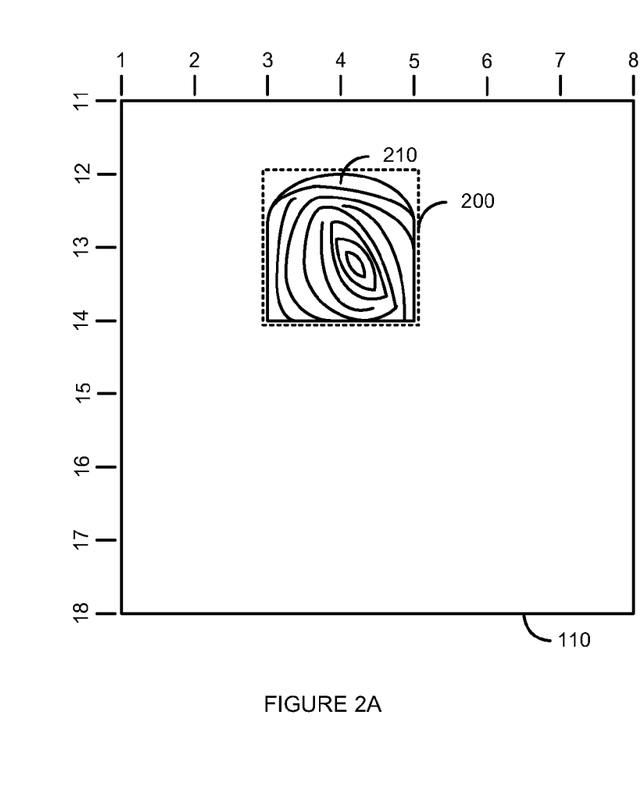
FIG. 2A is a bottom view looking up from under an optical surface for identifying a print portion of a body part in an area of the optical surface.
Figure 2B:
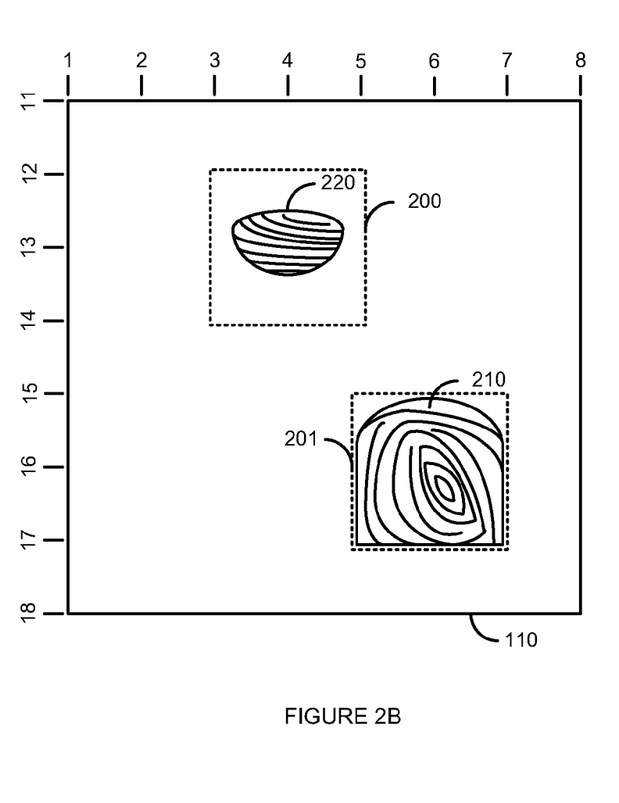
FIG. 2B is a bottom view looking up from under an optical surface for identifying different print portions of a body part in different areas of the optical surface.

FIGS. 2A-2B are a bottom view looking up from under an optical surface 110 for identifying a print portion (210, 220) of a body part 130 (e.g., a finger) in an area of the optical surface 110. FIGS. 2A-2B display a view that would be seen by the optical scanner 120 when the optical scanner 120 scans the body part 130. In this example, a finger is the body part 130; however other body parts 130 can be used. In FIGS. 2A-2B, the numbers 1-8 and 11-18 represent a grid that is used to identify areas in the optical surface 110. The grid is just one example of a way to identify areas in the optical surface 110. In this example, a first print portion 210 of the fingerprint (e.g., the bottom portion of a finger) is in area 200 (represented in the grid at 3-5/12-14). The print portion of the finger can be any print portion of a finger such as the tip of the finger, the bottom of the finger, the right side of the finger, the left side of the finger, and the like. The first print portion 210 in area 200 is in this example, where a person first touches the optical surface 110. The first print portion 210 of the fingerprint contains unique identifiable ridges in the finger that comprise a fingerprint of the person.

A second print portion 220 of the same fingerprint (e.g., the tip of the finger) is shown in FIG. 2B at the same area 200 (grid coordinates 3-5/12-14) of the optical surface 110. However, the second print portion 220 can be a print portion of a different finger or other body part 130 such as a toe or palm.

FIG. 2B also shows the first print portion 210 of the fingerprint in a second area 201 of the optical surface 110.

The optical scanner 120 gets the first print portion 210 of the fingerprint and the second print portion 220 of the fingerprint (and optionally other print portions of the same body part 130 and/or other body parts 130). The print portions (210, 220) could be taken from a database (not shown) of print portions or scanned by the optical scanner 120 using some type of software that allows the user to register various print portions. The optical scanner 120 that scans the print portions (210 and 220) can be the same or a different optical scanner 120. The scanning of the print portions (210 and 220) can be done by the optical scanner 120 in conjunction with application 180. The optical scanner 120 stores the print portions (210 and 220) and associates the print portions (210 and 220) with an area (200, 201) and an event. The association can be done using software that associates an area (e.g., 210, 220, or other areas) of the optical surface 110 with a print portion.

One option is to associate a first event with the first print portion 210 being in area 200 and a second event being associated with the second print portion 220 being in area 200 (i.e., at different times). For example, if the user touches area 200 with the first print portion 210 (e.g., the bottom of the user's index finger), then a selection event is generated and the user can drag an icon across the optical screen 110. If the user touches area 200 with the second print portion 220 of the index finger (e.g., the tip of the user's index finger), instead of a selection event being generated, a help menu event is generated, and the user can get help about the application represented by the touched icon. This can easily be extended to have other events associated with other print portions of the index finger, other fingers, and/or other body parts 130.

The event(s) that are generated can be a variety of events such as generating a capital letter, generating a non-capital letter, generating a first language character, generating a second language character, generating a number, generating a tooltip, selecting a text, providing a menu, moving a cursor, a left click event, a right click event, providing a help text, and the like. For example, assume that a soft keyboard is being displayed by the optical surface 110 for a text messaging application and area 200 represents the softkey for the letter "A"; when the user touches the A softkey with print portion 210, a capital letter "A" is displayed; when the user touches the same A softkey again with print portion 220, a non-capital letter "a" is displayed.

Another option can be to associate the first print portion 210 being in area 200 with a first event and associating the first print portion 210 being in area 201 with a different event, or the same event. Being able to associate different print portion(s) (210, 220) with different area(s) (200, 201) and/or different event(s) is a very flexible way of controlling and interacting with a user interface.

Figure 3A:
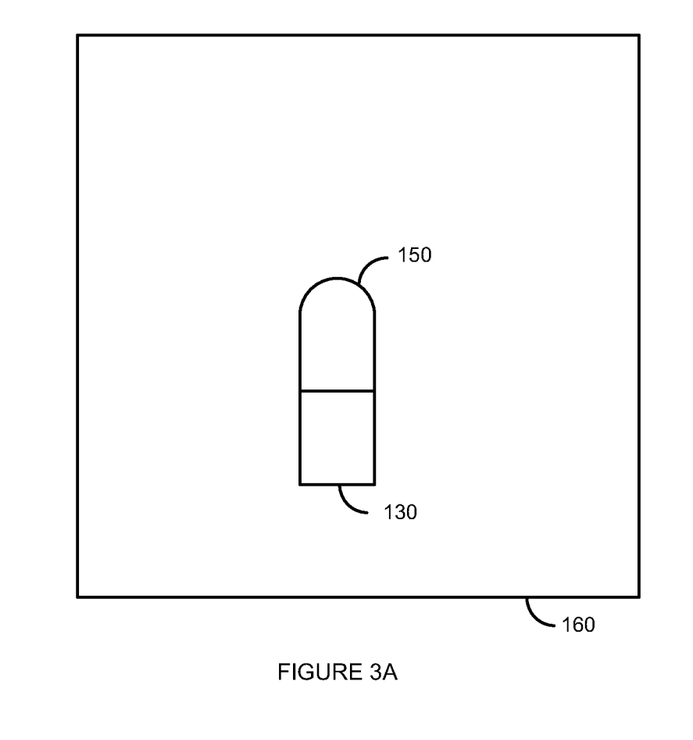
FIG. 3A is a top view looking down at a surface for identifying an area of a sleeve with different properties in an area of the surface.

FIG. 3A is a top view looking down at the surface 160 for identifying a property of a sleeve 150 in an area of the surface 160. The sleeve 150 contains multiple properties. The sleeve 150 is shown on the body part 130. In this example, the body part 130 is a finger. The finger with the sleeve 150 can be placed in contact with and/or above the surface 160 so that the property detector 170 can detect the different properties of the sleeve 150.

Figure 3B:
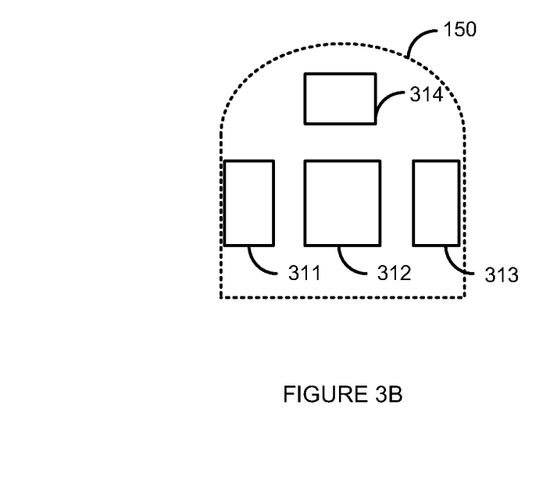
FIG. 3B is a bottom view of a cutout of an exemplary sleeve with different properties.

FIG. 3B is a bottom view of a cutout of an exemplary sleeve 150 with different properties. The view is from the bottom looking up to the bottom of the finger that has the sleeve 150 on. In this example, the sleeve 150 has four areas that contain different properties 311-314. Property 314 covers the tip of the finger. Property 312 covers the bottom of the finger. Property 313 covers the right side of the finger (looking from the bottom). Property 311 covers the left side of the finger (looking from the bottom).

In FIG. 3B the properties 311-314 are shown in a square pattern. The properties can be organized in various ways such as a circular shape, a shape conforming to the finger, a triangular shape, or various combinations of these, and the like. There can be more or less properties 311-314 in an area of the sleeve 150. The properties 311-314 can be closer together or further apart. The properties 311-314 can be different properties such as: a capacitive property, an inductive property, an impedance property, a resistive property, a color, or combinations of these, and the like.

Figure 4A:
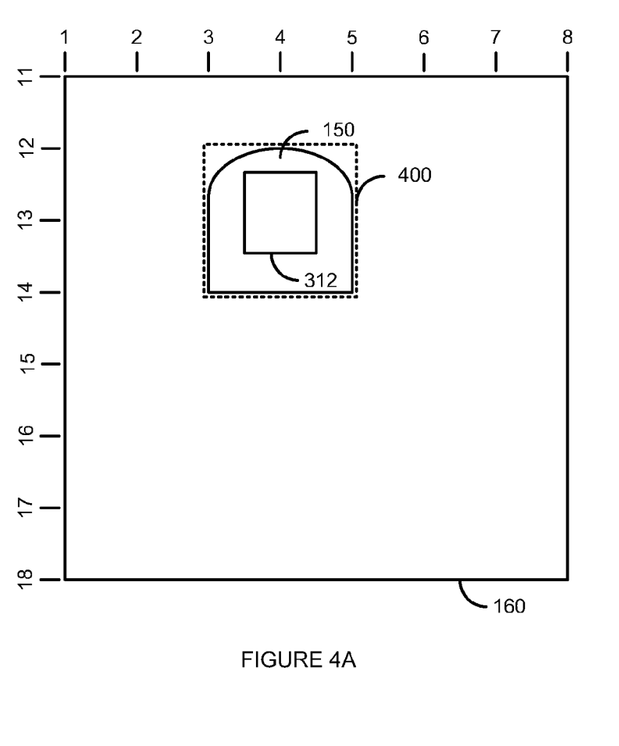
FIG. 4A is a bottom view looking up from under a surface for identifying different properties of a sleeve in an area of the surface.
Figure 4B:
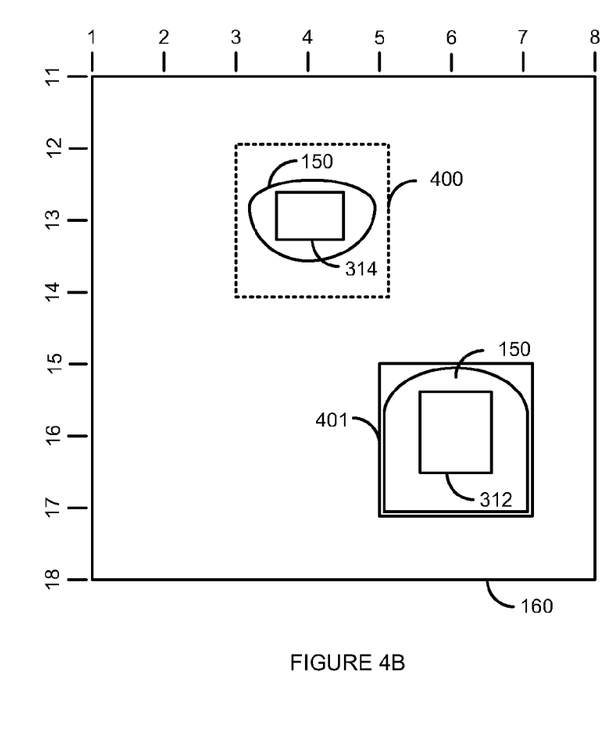
FIG. 4B is a bottom view looking up from under a surface for identifying different properties of a sleeve in different areas of the surface.

FIG. 4A is a bottom view looking up from under a surface 160 for identifying a property 311-314 of a sleeve 150 with different properties in an area of the surface 160. FIG. 4A is a view that would be seen by the property detector 170 when the property detector 170 detects different properties in the sleeve 150. In FIGS. 4A-4B, the numbers 1-8 and 11-18 represent a grid that is used to identify areas in the surface 160. In this example, property 312 (the property on the bottom of the sleeve 150) is in area 400 (represented by grid 3-5/12-14) of the surface 160.

FIG. 4B is a bottom view looking up from under a surface 160 for identifying different properties 311-314 of a sleeve 150 in areas of the surface 160. FIG. 4B is a view that would be seen by the property detector 170 when the property detector 170 detects different properties 311-314 of the sleeve 150. FIG. 4B shows two different properties (312 and 314) in different areas (400 and 401) of the surface 160. Property 314 (the property on the tip of the sleeve 150) is shown in area 400 (grid 3-5/12-14). Property 312 is shown in area 401 (grid 5-7/15-17).

The property detector 170 identifies property 312 of the sleeve 150 on the body part 130 in area 400 of the surface 160. Once the property detector 170 identifies property 312 in area 400, a first event is generated based on the identification of property 312 in area 400. In addition to the first event, additional events can also be generated.

The property detector 170 identifies property 314 of the sleeve 150 on the body part 130 in area 400. Once the property detector 170 identifies property 314 in area 400, a second event is generated based on the identification of property 314 in area 400. In addition to the second event, additional events can also be generated. The generated event can be any type of event such as generating a capital letter, generating a non-capital letter, generating a first language character, generating a second language character, generating a number, generating a tooltip, selecting a text, providing a menu, moving a cursor, a left click event, a right click event, providing a help text, and the like.

The property detector 170 identifies property 312 of the sleeve 150 on the body part 130 in area 401. Once the property detector 170 identifies property 312 in area 401, an event is generated. The generated event could be the first and/or second events described above or a different event(s). Detecting a specific property (311-314) in a specific area (400, 401) allows greater flexibility in generating different events.

The above descriptions describe the use of a single sleeve 150. However, multiple sleeves 150 can be used. For example, each finger can have a different sleeve 150 with different properties. This allows different events to be generated when the user touches the same area (e.g., area 400) with different parts of different sleeves 150.

The above descriptions describe the sleeve 150 touching the surface 160. However, the property detector 170 can also detect different properties that are above the surface 160 and/or are partially on the surface 160.

Figure 5A:
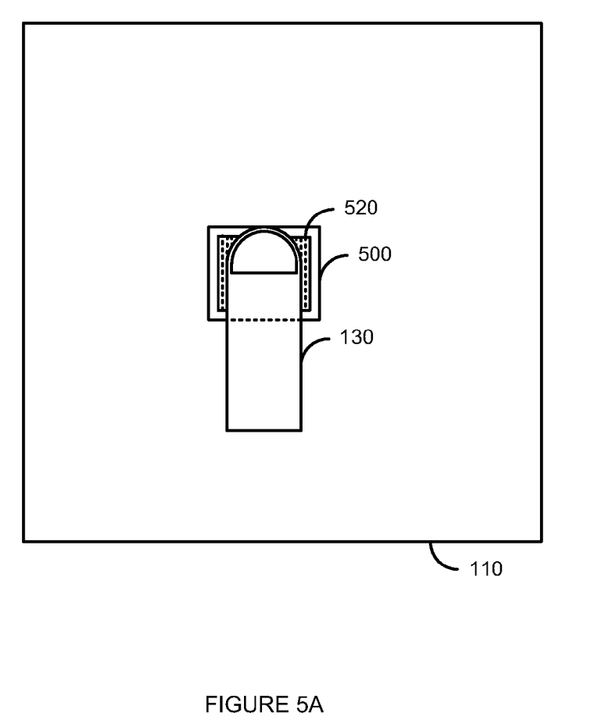
FIG. 5A is an exemplary top view of an optical surface that shows the generation of an event for use by an application when a first print portion is detected in an area.
Figure 5B:
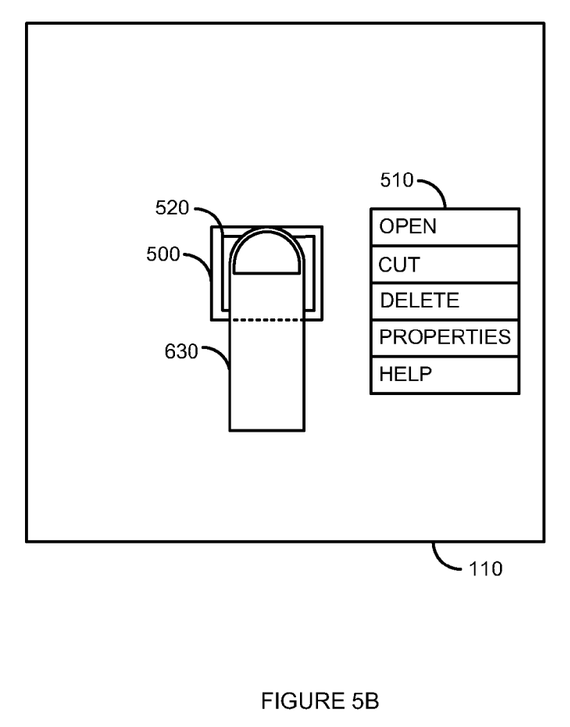
FIG. 5B is an exemplary top view of an optical surface that shows the generation of an event for use by an application when a second print portion of a second body part is detected in the area.

FIGS. 5A-5B are an exemplary top view of the optical surface 110 that shows the generation of different events for use by an application 180 when different print portions of different body parts (130, 630) are identified in an area 500 of the optical surface 110. In FIGS. 5A-5B, the body parts (130, 630) are different fingers of a user or even possibly different fingers of different users. The different fingers can be on the same hand, or on a different hand. In this illustrative example, area 500 in the optical surface 110 contains an icon 520 for application 180.

In FIG. 5A, the user touches (print portion 210 of finger 130) the optical surface 110 in area 500 that contains the icon 520 for application 180. The user does not have to touch the optical surface 110 as long as the optical scanner 120 can identify the print portion above the optical surface 110 or a combination of being above the optical surface 110 and on the optical surface 110. In this example, when the user touches icon 520 in area 500 with print portion 210 of finger 130, the optical scanner 120 identifies print portion 210 of finger 130. The optical scanner 120 determines if there is an associated event for the identified print portion 210 being in area 500. If there is an associated event for the identified print portion 210 being in area 500, the associated event is generated. In this example, the associated event highlights (illustrated by the darker shaded icon 520) icon 520 and launches application 180. Launching application 180 is just one of many different types of events that can be generated. In fact, multiple events can be generated when print portion 210 is identified in area 500.

In FIG. 5B, the user touches (i.e., with the bottom print portion of finger 630) the optical surface 110 in area 500 that contains the icon 520 for application 180. In this example, when the user touches icon 520 in area 500 with the bottom print portion of finger 630, the optical scanner 120 identifies the bottom print portion of finger 630. The optical scanner 120 determines if there is an associated event for the identified bottom print portion of finger 630 being in area 500. If there is an associated event for the identified print portion of finger 630 being in area 500, the associated event(s) are generated. In this example, the associated event opens a menu 510 that allows the user to select an operation to perform such as open application 180, cut icon 520, delete icon 520, get properties of application 180, and/or get help about application 180.

FIGS. 5A-5B show generation of events using the detection of print portions with an optical scanner 120. Likewise, similar types of events can be generated by identifying different properties 311-314 of a sleeve 150 in an area of the surface 160 with the property detector 170.

Figure 6:
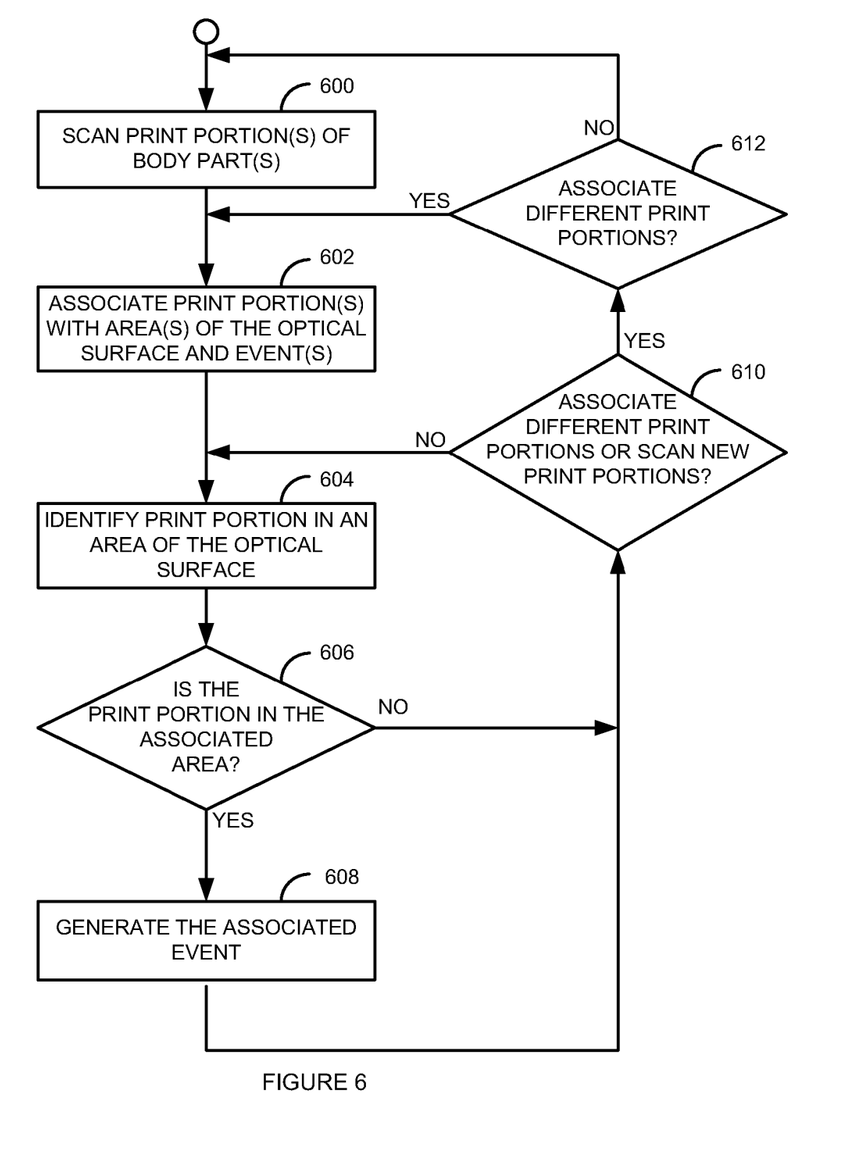
FIG. 6 is a flow diagram of a method for identifying a print portion of a body part in an area of an optical surface.

FIG. 6 is a flow diagram of a method for identifying a print portion(s) of a body part 130 in an area of an optical surface 110. Illustratively, the optical scanner 120, the property detector 170, and the application 180 comprise stored-program-controlled entities, such as a computer or processor, which performs the method of FIGS. 6-7 by executing a program stored in a storage medium, such as a memory or disk.

The optical scanner 120 scans 600 print portion(s) of one or more body parts 130 of one or more users. This can be done one at a time based on a software program asking the user to scan a specific print portion for a specific body part 130 such as the tip of the index finger. The user can be asked to place all of their fingers in specific areas of the optical surface 110 to be scanned simultaneously. The optical scanner 120 associates 602 the print portion(s) with area(s) of the optical surface 110 and event(s).

The optical scanner 120 identifies 604 a print portion in an area of the optical surface 110. The optical scanner 120 gets the scanned print portion(s) and the associated area(s) and event(s) from step 600 and 602 and compares the scanned print portion(s) associated with the area(s) to the identified print portion from step 604. If there is a match in step 606 between the scanned print portion(s) that are associated with the area that the identified print portion is in, the associated event(s) are generated 608 and the process goes to step 610. If there is not a match in step 606, the process goes to step 610.

The optical scanner 120 determines in step 610 if the user wants to associate different/new print portion(s) with different/new event(s) and/or scan new print portion(s). If the user does not want to associate different/new print portion(s) in step 610 with different/new event(s) and/or scan new print portions, the process goes to step 604. Otherwise, the process goes to step 612. In step 612, the optical scanner 120 determines if the user wants to associate different print portion(s) to different event(s)/area(s). If the user wants to associate different print portion(s) in step 612 to different event(s)/area(s), the process goes to step 602. Otherwise, if the user does not want to associate different print portions (i.e., the user wants to scan in new print portion(s)) in step 612 to different event(s)/area(s), the process goes to step 600.

Figure 7:
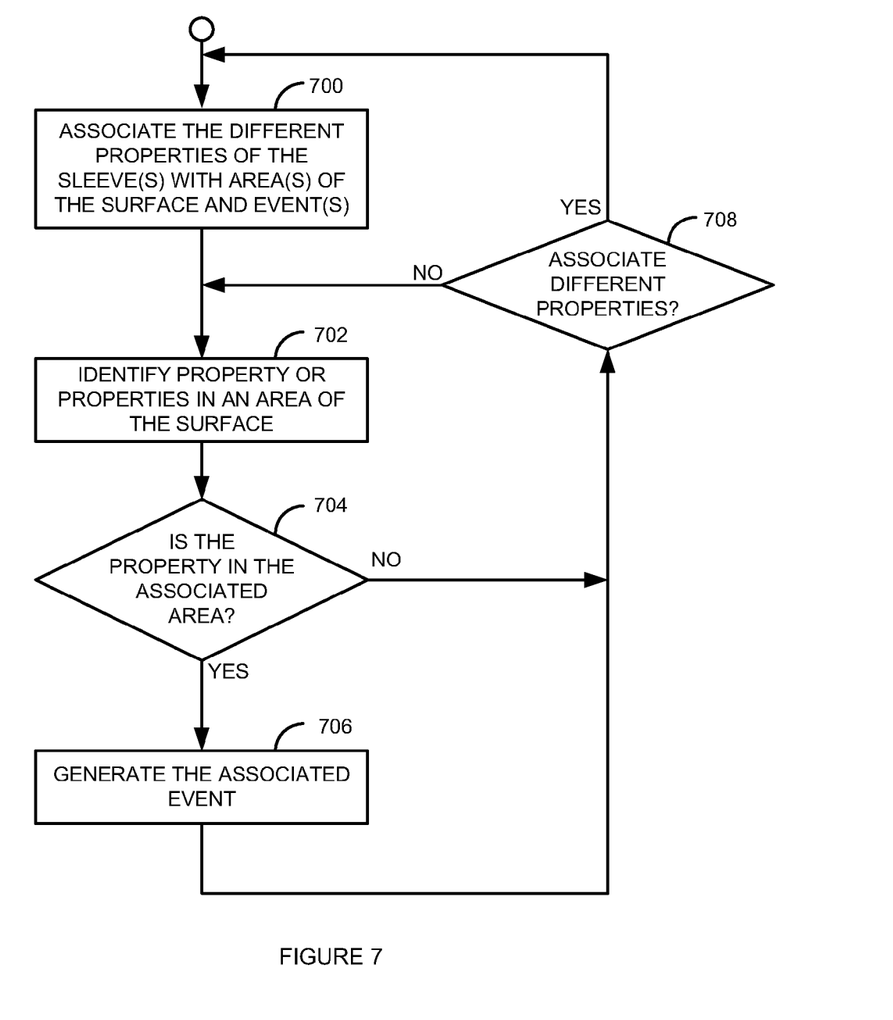
FIG. 7 is a flow diagram of a method for identifying a property of a sleeve in an area of a surface.

FIG. 7 is a flow diagram of a method for identifying a property 311-314 of a sleeve 150 in an area of a surface 160. The property detector 170 associates 700 different properties of the sleeve(s) 150 with area(s) of the surface 160 and event(s). The property detector 170 identifies 702 one or more properties 311-314 in an area of the surface 160. The property detector 170 determines in step 704 if the identified one or more properties are associated with the area that the identified property (from step 702) is in. If the identified one or more properties is associated with the area that the identified property is in, the associated event is generated in step 706 and the process goes to step 708.

Otherwise, if the identified one or more properties in step 704 is not associated with the area that the identified property is in, the process goes to step 708. In step 708, the property detector 170 determines if the user wants to associate different properties with different area(s) in the surface 160. If the user does not want to associate different properties in step 708 with different area(s) in the surface 160, the process goes to step 702. Otherwise, if the user wants to associate different properties in step 708, the process goes to step 700.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   a. getting a plurality of scanned print portions of a body part, wherein the body part is a finger and the plurality of scanned print portions comprises at least two of the following: a tip of the finger, a bottom of the finger, a right side of the finger, and a left side of the finger;
   b. identifying a first one of the plurality of scanned print portions of a user in a first area of an optical surface;
   c. generating a first event based on identifying the first one of the plurality of scanned print portions of the user in the first area of the optical surface;
   d. identifying a second one of the plurality of scanned print portions of the user in the first area of the optical surface; and
   e. generating a second event based on identifying the second one of the plurality of scanned print portions of the user in the first area of the optical surface, wherein the second event is different from the first event.

2. The method of claim 1, further comprising the steps of scanning the body part to get the plurality of scanned print portions and associating the first scanned print portion with the first area and the first event.

3. The method of claim 1, wherein the body part comprises a plurality of body parts, and further comprising the step of scanning the plurality of body parts to get the plurality of scanned print portions.

4. The method of claim 1, further comprising the steps of:
   f. identifying the first one of the plurality of scanned print portions of the user in a second area of the optical surface; and
   g. generating a third event based on identifying the first one of the plurality of scanned print portions of the user in the second area of the optical surface, wherein the third event is different from the first event and the second event.

5. The method of claim 1, wherein the event is one of the following: generating a capital letter, generating a non-capital letter, generating a first language character, generating a second language character, generating a number, generating a tooltip, selecting a text, providing a menu, moving a cursor, generating a left click event, generating a right click event, and providing a help text.

6. The method of claim 1, wherein the optical surface is at least one of the following: a touch screen, a computer screen, a mouse pad, a surface on a mouse, a surface on a joystick, a surface on a gaming controller, an LCD display, and a surface on a button.

7. The method of claim 1, wherein the finger includes a thumb.

8. The method of claim 1, wherein the first one of scanned print portions of the user in the first area of the optical surface comprises at least one of the following: the first scanned print portion being on the optical surface, the first scanned print portion being above the optical surface, and the first scanned print portion being both above and on the optical surface.

9. A system comprising:
   a. an optical scanner configured to get a plurality of scanned print portions of a body part, wherein the body part is a finger and the plurality of scanned print portions comprises at least two of the following: a tip of the finger, a bottom of the finger, a right side of the finger, and a left side of the finger, identify a first one of the plurality of scanned print portions of a user in a first area of an optical surface, generate a first event based on identifying the first one of the plurality of scanned print portions of the user in the first area of the optical surface, identify a second one of the plurality of scanned print portions of the user in the first area of the optical surface, and generate a second event based on identifying the second one of the plurality of scanned print portions of the user in the first area of the optical surface, wherein the second event is different from the first event.

10. The system of claim 9, wherein the optical scanner is further configured to scan the body part to get the plurality of scanned print portions and associate the first scanned print portion with the first area and the first event.

11. The system of claim 9, wherein the body part comprises a plurality of body parts, and further comprising the step of scanning the plurality of body parts to get the plurality of scanned print portions.

12. The system of claim 9, wherein the optical scanner is further configured to identify the first one of the plurality of scanned print portions of the user in a second area of the optical surface and generate a third event based on identifying the first one of the plurality of scanned print portions of the user in the second area of the optical surface, wherein the third event is different from the first event and the second event.

13. The system of claim 9, wherein the event is one of the following: generating a capital letter, generating a non-capital letter, generating a first language character, generating a second language character, generating a number, generating a tooltip, selecting a text, providing a menu, moving a cursor, generating a left click event, generating a right click event, and providing a help text.

14. The system of claim 9, wherein the optical surface is at least one of the following: a touch screen, a computer screen, a mouse pad, a surface on a mouse, a surface on a joystick, a surface on a gaming controller, an LCD display, and a surface on a button.

15. The system of claim 9, wherein the finger includes a thumb.

16. The system of claim 9, wherein the first one of scanned print portions of the user in the first area of the optical surface comprises at least one of the following: the first scanned print portion being on the optical surface, the first scanned print portion being above the optical surface, and the first scanned print portion being both above and on the optical surface.

17. The method of claim 1, wherein getting the plurality of scanned print portions of a body part includes retrieving the plurality of scanned print portions from a database.

18. The method of claim 1, further comprising the steps of detecting a print portion of the user in the first area of the optical surface, determining that the detected print portion of the user does not match at least one of the following: the plurality of scanned print portions of the body part, and an associated event for the first area of the optical surface associated with the detected print portion of the user.

19. The method of claim 18, wherein the detected print portion of user does not match the plurality of scanned print portions of the body part, and determining whether the user wants to scan the detected print portion of the user.

20. The method of claim 18, wherein the detected print portion of user does not match the associated event for the first area of the optical surface associated with the detected print portion of the user, and determining whether the user wants to associate the detected print portion with a new event for the first area of the optical surface.

* * * * *